(12) United States Patent
Rothman et al.

(10) Patent No.: US 7,900,033 B2
(45) Date of Patent: Mar. 1, 2011

(54) FIRMWARE PROCESSING FOR OPERATING SYSTEM PANIC DATA

(75) Inventors: Michael A. Rothman, Puyallup, WA (US); Vincent J. Zimmer, Federal Way, WA (US)

(73) Assignee: Intel Corporation, Santa Clara, CA (US)

( * ) Notice: Subject to any disclaimer, the term of this patent is extended or adjusted under 35 U.S.C. 154(b) by 900 days.

(21) Appl. No.: 11/768,391

(22) Filed: Jun. 26, 2007

(65) Prior Publication Data

US 2009/0006827 A1    Jan. 1, 2009

(51) Int. Cl.
*G06F 11/20* (2006.01)
(52) U.S. Cl. .................................. 713/2; 713/1; 713/100
(58) Field of Classification Search .................. 713/1, 2, 713/100
See application file for complete search history.

(56) References Cited

U.S. PATENT DOCUMENTS

| 6,230,286 B1* | 5/2001 | Shapiro et al. ................. 714/23 |
| 2006/0271881 A1* | 11/2006 | Luciani et al. ............... 715/790 |
| 2008/0052599 A1* | 2/2008 | Aasheim et al. ............. 714/763 |

OTHER PUBLICATIONS

Pending U.S. Appl. No. 10/807,758; Title: "Methods and Apparatus to Provide an Execution Mode Transition".; Inventors: Vincent J. Zimmer & Michael A. Rothman.; Filing date: Mar. 24, 2004.
Rothman, Michael,; "UEFI 2.0 Specification Launch," Apr. 2006, available at http://download.intel.com/technology/efi/docs/pdfs/EFIS00ISpr06.pdf .; pp. 49.; Cite last visited Jun. 19, 2007.
Unified EFI, Inc.; Unified Extensible Firmware Interface Specification,; Version 2.1,; Jan. 23, 2007.; pp. 1, 233-276.

* cited by examiner

*Primary Examiner* — Abdelmoniem Elamin
(74) *Attorney, Agent, or Firm* — Barnes & Thornburg, LLP

(57) ABSTRACT

A processor includes firmware and at least one instance of an operating system (OS). When the OS encounters an unrecoverable error (a "panic"), data regarding the error is pushed to the firmware via capsule services, rather than immediately being displayed to the screen via legacy video INT10h services. The panic data may be provided to the OS and displayed by the OS after a reset. Other embodiments are also described and claimed.

21 Claims, 7 Drawing Sheets

FIRMWARE PROCESSING FOR OPERATING SYSTEM PANIC DATA

BACKGROUND

1. Technical Field

The present disclosure relates generally to information processing systems and, more specifically, to post-reset firmware processing for runtime data.

2. Background Art

Before a computer system can operate, it must have an operating system (OS) in its memory that allows the computer's resources to be reached and controlled by the other software, such as the various application programs. Loading of this operating system is performed during initialization processing, referred to as "boot" or "re-boot" processing, that is performed when a system experiences a power cycle or warm start event.

Traditionally, a computer system includes a basic input/output system (BIOS) memory that stores the code for the boot sequence that the central processing unit (CPU) executes to detect, apply power to, and initialize the computer components. The BIOS performs a power-on self-test (POST) when the system is turned on. This test is used to ensure that the system is functioning properly and to gather information about what the system contains. When a problem is identified with the system during the POST, the BIOS may produce an error message. The message is displayed to the user screen, as a result of the BIOS accessing the video card to print the message. The mechanism that the BIOS uses to print the boot message to the screen is a BIOS interrupt call facility. Specifically, Int 10h is called by the BIOS in order to utilize video services to print error information to the screen.

The Int 10h facility may also sometimes be used by the operating system. For example, the Int 10h video services interrupt facility may be utilized to provide error information to the screen when an OS panic or "screen of death" occurs. Such a panic occurs when the OS detects an internal system error from which it cannot recover. Attempts by the operating system to read an invalid or non-permitted memory address are a common source of kernel panics. A panic may also occur as a result of a hardware failure or a bug in the operating system.

In contrast to the traditional boot method described above, various mechanisms also exist for secure booting. The Unified Extensible Firmware Interface (UEFI) specification defines a model for the interface between operating systems and platform firmware. The interface consists of data tables that contain platform-related information, plus boot and runtime service calls that are available to the operating system and its loader. Together, these provide a standard environment for booting an operating system and running pre-boot applications. More information about UEFI may be found on the public Internet at URL www*uefi*org/home. Please note that periods have been replaced with asterisks in this document to prevent inadvertent hyperlinks. The UEFI standard describes an application programmer interface (API) that allows the operating system to pass data to the firmware. The mechanism for passing information from the OS to the firmware in the UEFI standard may be referred to as a "capsule". By passing runtime OS panic data to firmware using the capsule mechanism, reliance on the legacy Int 10h facility may be avoided.

BRIEF DESCRIPTION OF THE DRAWINGS

Embodiments of the present invention may be understood with reference to the following drawings in which like elements are indicated by like numbers. These drawings are not intended to be limiting but are instead provided to illustrate selected embodiments of systems, methods and mechanisms to utilize capsule services for an OS panic.

DETAILED DESCRIPTION

The following discussion describes selected embodiments of methods, systems and mechanisms to push data regarding an unrecoverable OS error to the firmware via capsule services, rather than displaying the data to the screen via legacy video INT10h services. The apparatus, system and method embodiments described herein may be utilized with single-core or multi-core systems that may be either stand-along systems or part of a network. In the following description, numerous specific details such as interconnect and system topologies, system configurations, and particular order of operations for method processing have been set forth to provide a more thorough understanding of embodiments of the present invention. It will be appreciated, however, by one skilled in the art that the invention may be practiced without such specific details. Additionally, some well known structures, circuits, and the like have not been shown in detail to avoid unnecessarily obscuring the present invention.

The UEFI specification describes an API (application programming interface) that allows the OS to pass run-time data (e.g., data this is available only after OS boot) to the firmware. In particular, the UEFI specification describes a class of runtime services that are sometimes referred to as capsule services. The capsule services include the UpdateCapsule service. The UpdateCapsule runtime service is a runtime function that allows a caller to pass information to the firmware. UpdateCapsule may be used, for example, to update the firmware flash or to enable an operating system to pass to the firmware information that is intended to persist across a system reset.

The firmware may process the capsules immediately. Alternatively, the firmware may return a value to be passed into another runtime service, ResetSystem( ), which resets the entire platform. Passing this value to ResetSystem( ) will cause the capsule to be processed by the firmware as part of the reset process.

Figure 1:
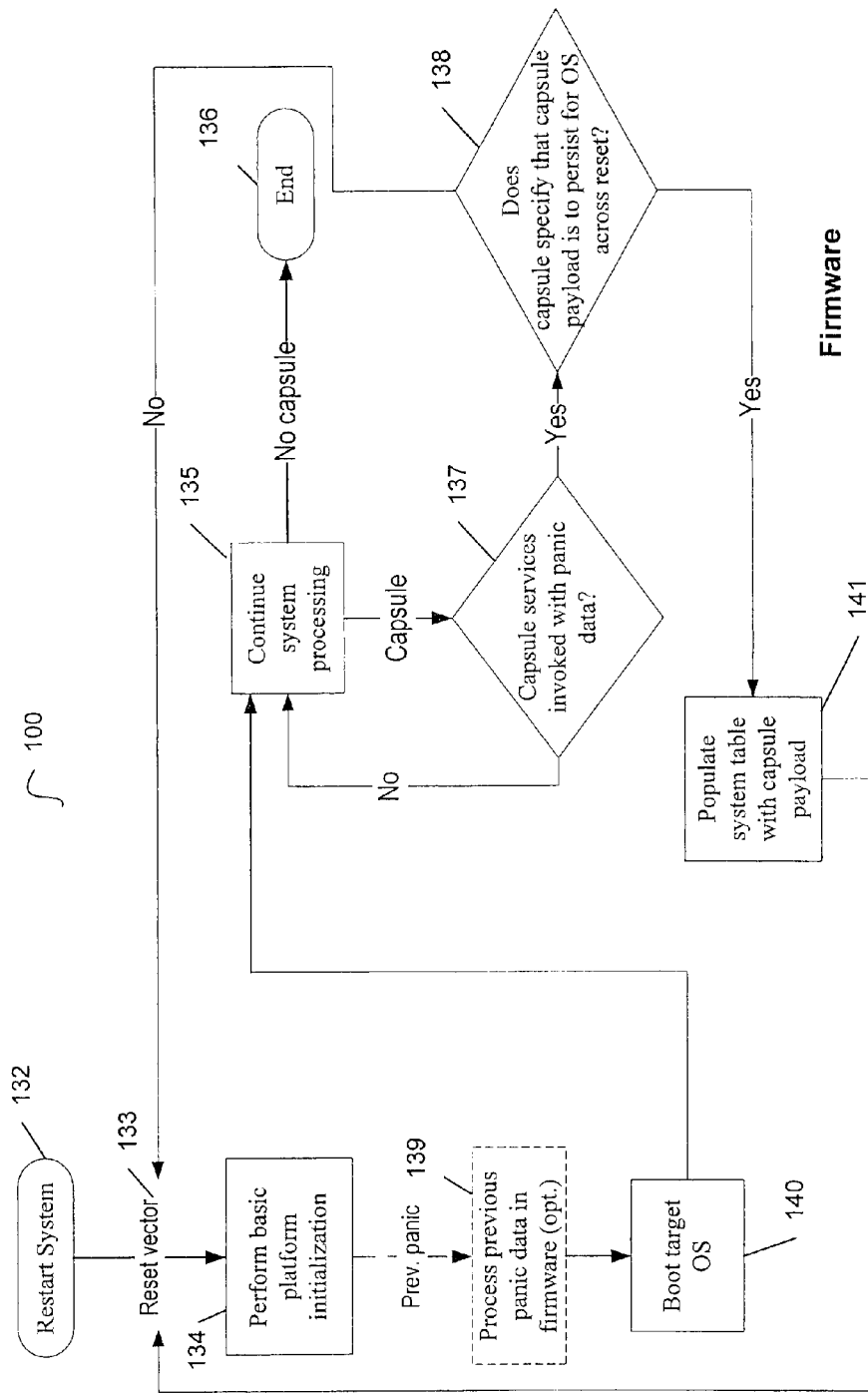
FIG. 1 is a flowchart illustrating at least one embodiment of a firmware method that utilizes capsule services to process information related to an OS panic.

FIG. 1 is a flowchart illustrating at least one embodiment of a method 100 that utilizes capsule services to process information related to an OS panic. For at least one embodiment, the method 100 is performed by firmware instructions stored in a firmware memory, such as a non-volatile flash memory (see, e.g., 351 of FIGS. 3A and 3B), of a processing system.

FIG. 1 illustrates that processing for the method 100 begins at block 132, where the processing system is restarted. That is, in many common processing systems, the boot process is started with a restart function of some kind. This might be a cold restart (power to the hardware is initially off), a warm restart (the hardware is already powered up), or one of several other starting conditions. A transition out of sleep or hibernate states may be a warm restart.

The reset function typically resets hardware to a known state and generates a reset interrupt, which vectors the system to a program in non-volatile memory and begins execution from that point.

FIG. 1 illustrates that the reset vector 133 is dispatched responsive to the system reset event 132. The reset vector 133 causes a Basic Input-Output System (BIOS) program (typically stored in flash memory) to be invoked at block 134. The BIOS program enables basic input-output (IO) control. Typically, the BIOS has no information about the environment required by the operating system and therefore can do nothing to initialize the system beyond putting the hardware into a known state.

At block 134, the BIOS code performs typical start-up functions such as detecting memory, detecting all system CPU's, and detecting I/O apertures as well as initializing such hardware components. Other additional initialization processing may be performed by the BIOS at block 134, such as loading any microcode patches that have been incorporated into the BIOS code. From Block 134, processing may optionally proceed to block 139. Otherwise, processing proceeds directly to block 140.

At block 139, the firmware may perform processing for panic data that was received before the reset (132). Such data may have been received, for example, via an UpdateCapsule call before the reset (see, e.g., discussion of block 314 of FIG. 2, below). If such capsule data was not previously received, then such optional processing (139) is not performed, and processing instead proceeds to block 140.

If, however, previous panic data was received before the current reset, then the data may be processed at block 139. Here again, such processing is optional. That is, even if a previous capsule with panic data was received, before the current reset, the processing of block 139 may be skipped if it was intended that the processing for the panic data be performed solely by the operating system after re-boot (see, e.g., block 140 and block 210 of FIG. 2).

For instance, in some embodiments, it may be desired that panic data received by the firmware via a capsule is to be processed only by the firmware and is not to be serviced at all by the OS. In such case, the data is processed solely at block 139. For other embodiments, it may be desired that at least some of the data be processed by the firmware at block 139 during pre-boot, but that some processing of the data is also performed by the OS after the OS has been booted at block 140. For still other embodiments, it may be desired that the panic data be serviced only by the OS after booting, and that the data not be serviced by the firmware at all during pre-boot. In this latter case, block 139 is not performed. (Note that, in the latter case, the firmware still, for at least some embodiments, minimally handles the capsule data as indicated in the discussion of block 141, below, so that it will be available to the OS after re-boot).

Accordingly, for various embodiments, various types of processing may be performed by the firmware at block 139. For purposes of illustration, various embodiments of such processing are discussed below. However, such discussion should not be taken to be limiting. One of skill in the art will recognize that various other actions, as well as various combinations of the actions described below, may be implemented in embodiments of a method 100 for processing runtime OS panic data that has been passed to the firmware via capsule services.

For at least one embodiment, the firmware may pass at least a portion of the panic data to an error log at block 139.

For at least one other embodiment, the firmware may send, at block 139, at least a portion of the panic data to another processor. For example, the data may be provided to an out-of-band microcontroller as discussed below in connection with FIG. 5. Such embodiment may be employed, for example, for a processing system that includes several processors (such as, e.g., servers in a rack) that are not individually associated with dedicated display screens. For such an embodiment, the panic data may instead be sent, at block 139, to an out-of-band controller that may, in turn, display the information to a display screen for a remote administrator.

Figure 3A:
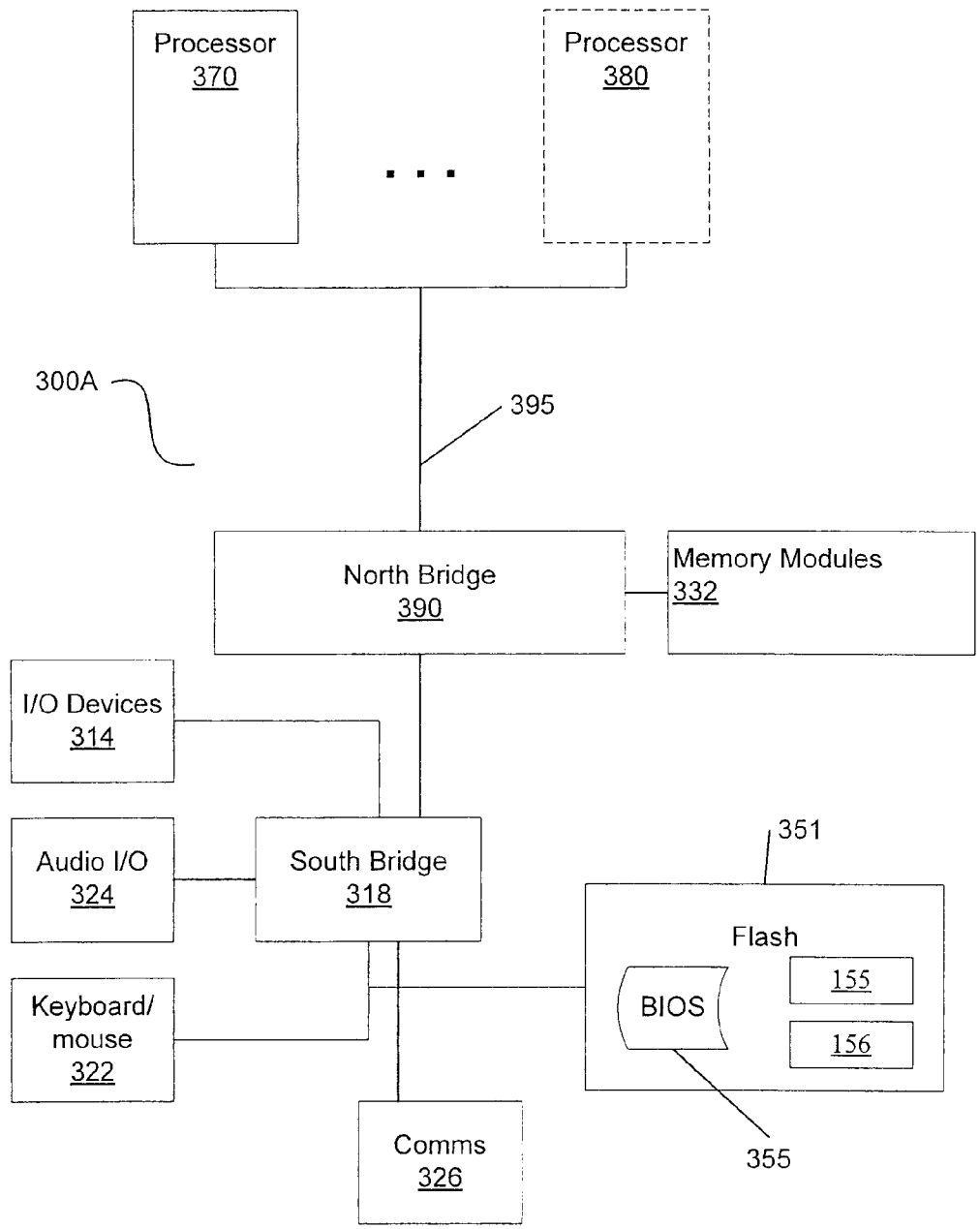
FIG. 3A is a block diagram of a multiprocessor system in accordance with an embodiment of the present invention that includes multi-drop bus communication pathways.

For at least one other embodiment, the firmware may send, at block 139, at least a portion of the panic data to a diagnostic script that is to analyze the processor that incurred the unrecoverable error. The script may, for at least one embodiment, run on different processor than the faulting processor. For example, the diagnostic script for an embodiment of a multi-processor system 300A as illustrated in FIG. 3A may run on the second processor 380 if the first processor 370 encounters the unrecoverable error. For such embodiment, the healthy processor 380 may run the script, and thus access the capsule payload, during the BIOS flow after the warm (CPU-only, non-destructive to memory) reset. Such embodiment is based on the observation that, in a multicore embodiment, it is unlikely that all CPU's will experience a panic at the same time.

As another example, the script may run on an out-of-band microcontroller, such as that described below in connection with FIG. 5. For such embodiment, the capsule payload may be parsed by an out-of-band microcontroller that has access to host memory. Such embodiment may allow, for example, the out-of-band microcontroller to post an indicia of the error to a local console.

The script may, for at least one embodiment, access a portion of the panic data that identifies the name of the software module that encountered the error. The script may check to determine whether an updated or patched version of the faulting application is available. If so, during the next iteration of pre-boot processing after the reset (see block 134), the firmware can invoke an upload of the patch to the processor (if such a patch is available).

For at least one other embodiment, the firmware may display at least a portion of the panic data to a display screen during block 139. Printing of the panic data to the screen may be effected via a native driver that can communicate with the video device and allows the firmware to initiate, at block 139, rudimentary print-to-screen services. For at least one embodiment, the native driver is a UEFI-compliant driver that either resides in the firmware or is provided by the video card itself. Regardless of the specific manner in which the display of panic data is accomplished at block 139, it will be understood by one of skill in the art that the display of data at block 139 is performed without reliance on INT10h services.

As stated above, the actions taken at block 139 may be a combination of actions—either a combination of those actions described above, a combination of additional actions that would be implemented by one of skill in the art, or a combination of described and nondescribed actions.

At block 140, the target operating system is booted. For at least one embodiment, at block 140 the BIOS program loads the OS into main memory from a disk. From block 140, processing proceeds to block 135.

At block 135, system processing is continued until a capsule service is invoked. If no capsule services are invoked, system processing continues as normal and ends at block 136.

If, however, capsule services are invoked during system processing by the firmware, FIG. 1 illustrate that processing then proceeds to block 137. That is, block 137 is executed if the operating system has invoked capsule services.

For at least one embodiment, capsule services are invoked when the OS sends a capsule to the firmware by calling the UpdateCapsule runtime service.

At block 137, it is determined whether the detected invocation of capsule services involves a panic payload. If so, processing proceeds to block 138. Otherwise, the capsule is processed normally at block 135.

Depending on the intended consumption, the firmware may process the capsule immediately. Alternatively, according to the UEFI specification, a capsule may specify that the capsule payload is to persist across a system reset. At block 138, it is determined whether the capsule detected at block 136 is intended to persist across a system reset. If not, the firmware stores the capsule data so that it may processed during pre-boot after the reset (see block 139), and reset processing is then performed.

If, alternatively, it is determined at block 138 that it is intended that at least a portion of the capsule data is to be processed by the OS after the impending reset, then processing proceeds to block 141. In such cases, the panic capsule data may be recorded in a non-volatile, persistent system table (e.g., see 156 of FIG. 3) so that the panic data is retained and is available to the OS after the system re-boots. After the panic data is recorded in the system table at block 141, reset processing is then performed.

Figure 2:
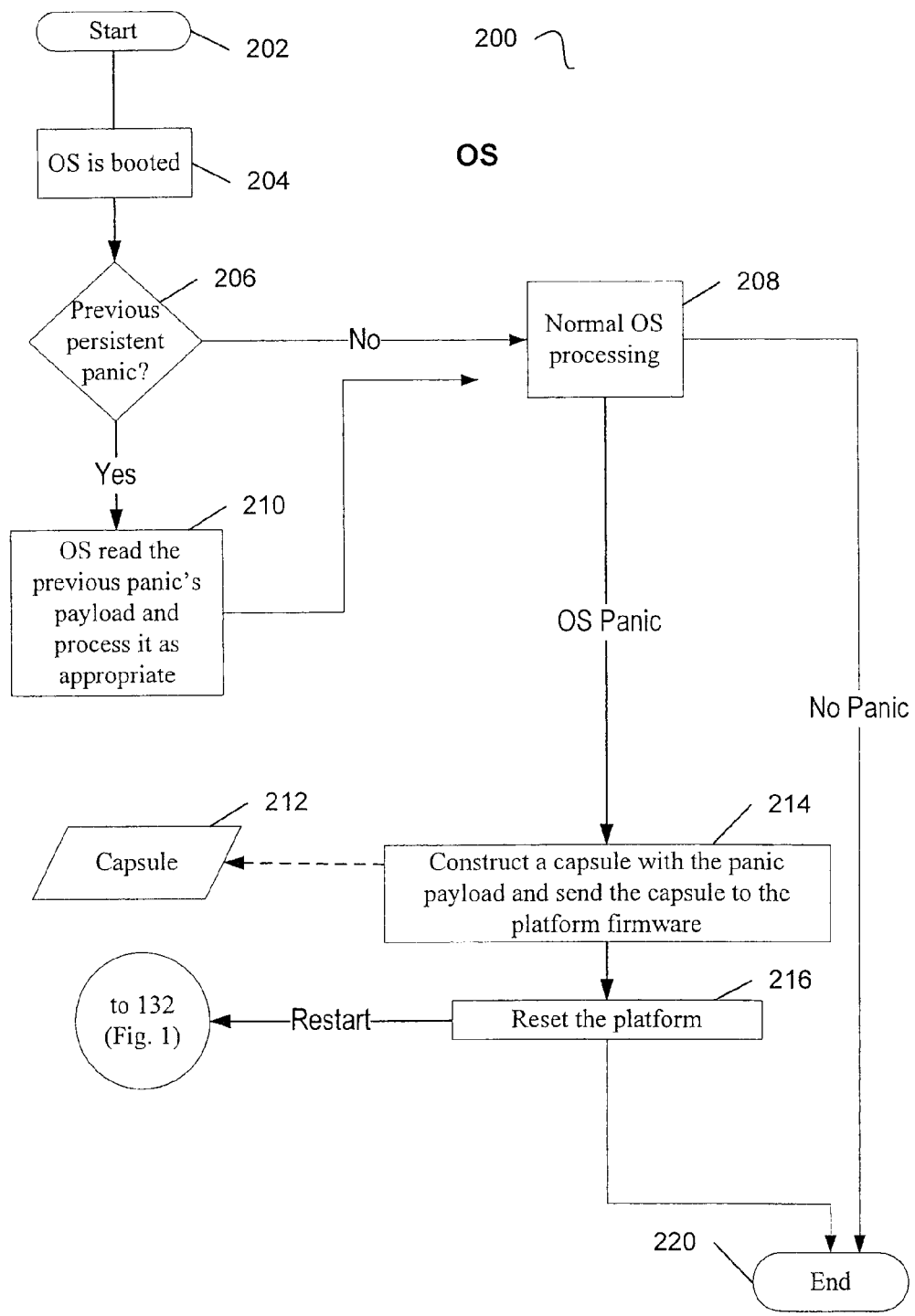
FIG. 2 is a flowchart illustrating at least one embodiment of an OS method that utilizes capsule services to process information related to an OS panic.

FIG. 2 is a data- and control-flow diagram illustrating at least one embodiment of a method 200 for providing panic data to the firmware and for, in some instances, processing the panic data after a reset. For at least one embodiment, method 200 is performed by an operating system.

FIG. 2 illustrates that the method 200 begins at block 202 and proceeds to block 204. At block 204 the OS becomes operational (e.g., see block 140 of FIG. 1). Processing then proceeds to block 206.

At block 206, the operating system determines whether previous panic data is available to it. For at least one embodiment, the operating system makes the determination at block 206 by inspecting the system table (e.g., see block 141 of FIG. 1) to determine whether any persistent panic data is available to it. If so, processing proceeds to block 210; otherwise, processing proceeds to block 208, where normal OS processing continues.

At block 210, the OS reads the previous panic data from the system table and processes it accordingly. Such processing may involve, for example, displaying at least a portion of data to the display screen. For other embodiments, other or additional actions may be performed by the OS at block 210. At least some examples of the types of actions that may be taken at block 210 by the operating system are along the same lines as those firmware actions described above in connection with block 139. After the appropriate action has been taken at block 210, normal OS processing proceeds at block 208.

If no unrecoverable errors are encountered during OS processing, the method 200 proceeds from block 208 to block 220, where OS processing ends.

Alternatively, if an unrecoverable error (a "panic") is encountered by the operating system during normal OS processing, processing proceeds from block 208 to block 214.

At block 214, the OS constructs a capsule 212 with the panic payload and sends the capsule to the platform firmware. For at least one embodiment, this capsule 212 is sent to the firmware via capsule services, such as an UpdateCapsule call. From block 214, processing proceeds to block 216.

At block 216, the OS initiates a reset of the platform. OS processing then ends at block 220.

Discussed immediately below are various embodiments of systems 300, 400, 500 on which embodiments of the methods 100, 200 of FIGS. 1 and 2 may be performed. When utilized together, the methods 100, 200 provide a means that allows the operating system to avoid calling INT 10h services to display runtime panic data to a display screen when an OS panic occurs.

FIG. 3A is a block diagram of a first embodiment of a system 300 capable of performing disclosed techniques.

The system 300 illustrated in FIG. 3A may include one or more processors 370, 380, which are coupled to a north bridge 390. The optional nature of additional processors 380 is denoted in FIG. 3A with broken lines.

The north bridge 390 may be a chipset, or a portion of a chipset. The north bridge 390 may communicate with the processor(s) 370, 380 and control interaction between the processor(s) 370, 380 and memory 332. The north bridge 390 may also control interaction between the processor(s) 370, 380 and Accelerated Graphics Port (AGP) activities. For at least one embodiment, the north bridge 390 communicates with the processor(s) 370, 380 via a multi-drop bus, such as a frontside bus (FSB) 395.

FIG. 3A illustrates that the north bridge 390 may be coupled to another chipset, or portion of a chipset, referred to as a south bridge 318. For at least one embodiment, the south bridge 318 handles the input/output (I/O) functions of the system 300, controlling interaction with input/output components. Various devices may be coupled to the south bridge 318, including, for example, a keyboard and/or mouse 322, communication devices 326, and an audio f/O as well as other I/O devices 314. The other I/O devices may include a user display terminal or screen.

Further, flash memory 351 may be coupled to the south bridge 318. The flash memory 351 may include code BIOS code 355, in one embodiment. The flash memory 351, which is non-volatile memory, may also include, for at least one embodiment, the firmware instructions 155 for a capsule logic module, e.g., UpdateCapsule, as discussed above with reference to FIGS. 1 and 2. Other logic as discussed herein with relation to embodiments of the methods 100, 200 discussed above may also reside in the firmware logic modules 155. In addition, the flash memory 351 may also include, for at least one embodiment, a persistent storage location 156 to store data, such as a system table, that is accessible to the operating system after a reset.

Figure 3B:
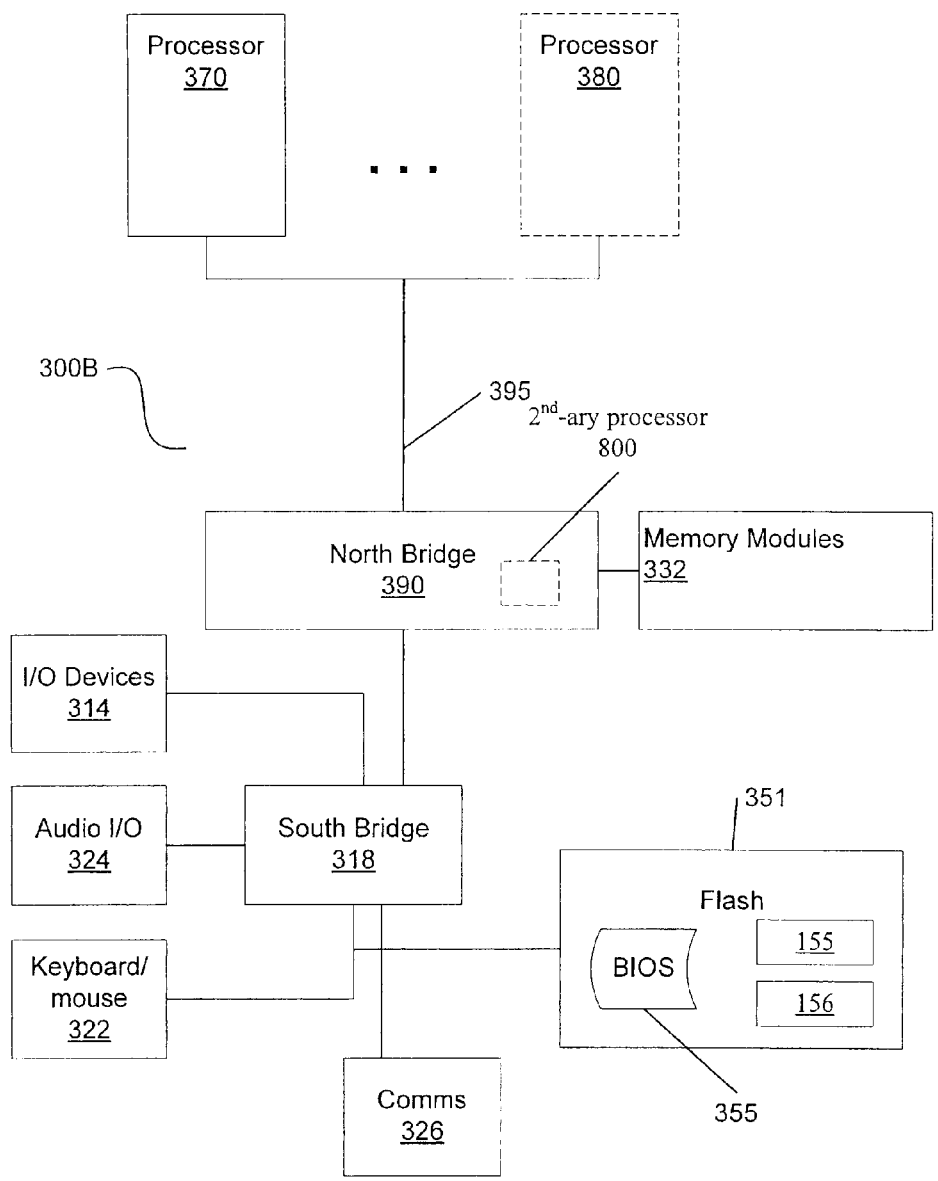
FIG. 3B is a block diagram of a multiprocessor system in accordance with a second embodiment of the present invention that includes multi-drop bus communication pathways.

FIG. 3B is a block diagram of a second embodiment of a system 300B capable of performing disclosed techniques. Like elements in FIGS. 3A and 3B bear like reference numerals.

The system 300B may optionally include a secondary processor 800. The optional nature of additional processors 380, 800 is denoted in FIG. 3B with broken lines.

FIG. 3B illustrates at least one embodiment of a secondary processor 800 that may receive panic data during pre-boot. The secondary processor may reside in the north bridge 390. Such embodiment is, of course, just one of many embodiments. In other embodiments, for example, the secondary processor 800 may be stand-alone processor that is not incorporated into the north bridge 390, or may be incorporated into a different element of the system.

For at least one embodiment, the secondary processor 800 may be a processor utilized to execute firmware that implements an Intel® Management Engine. As such, the processor 800 may part of a system 300B that implements the functionality of Intel® Active Management Technology ("Intel® AMT"). For such embodiment, the communication devices 326 of the system 300B may include a network connection, such as the Intel® 82566DM Gigabit Network Connection. This network connection identifies out-of-band network traffic (traffic targeted to Intel® AMT), and routes it to the secondary processor 800 rather than to the main processor(s) 370, 380. Thus, the network connection may be coupled to the secondary processor 800.

Figure 4A:
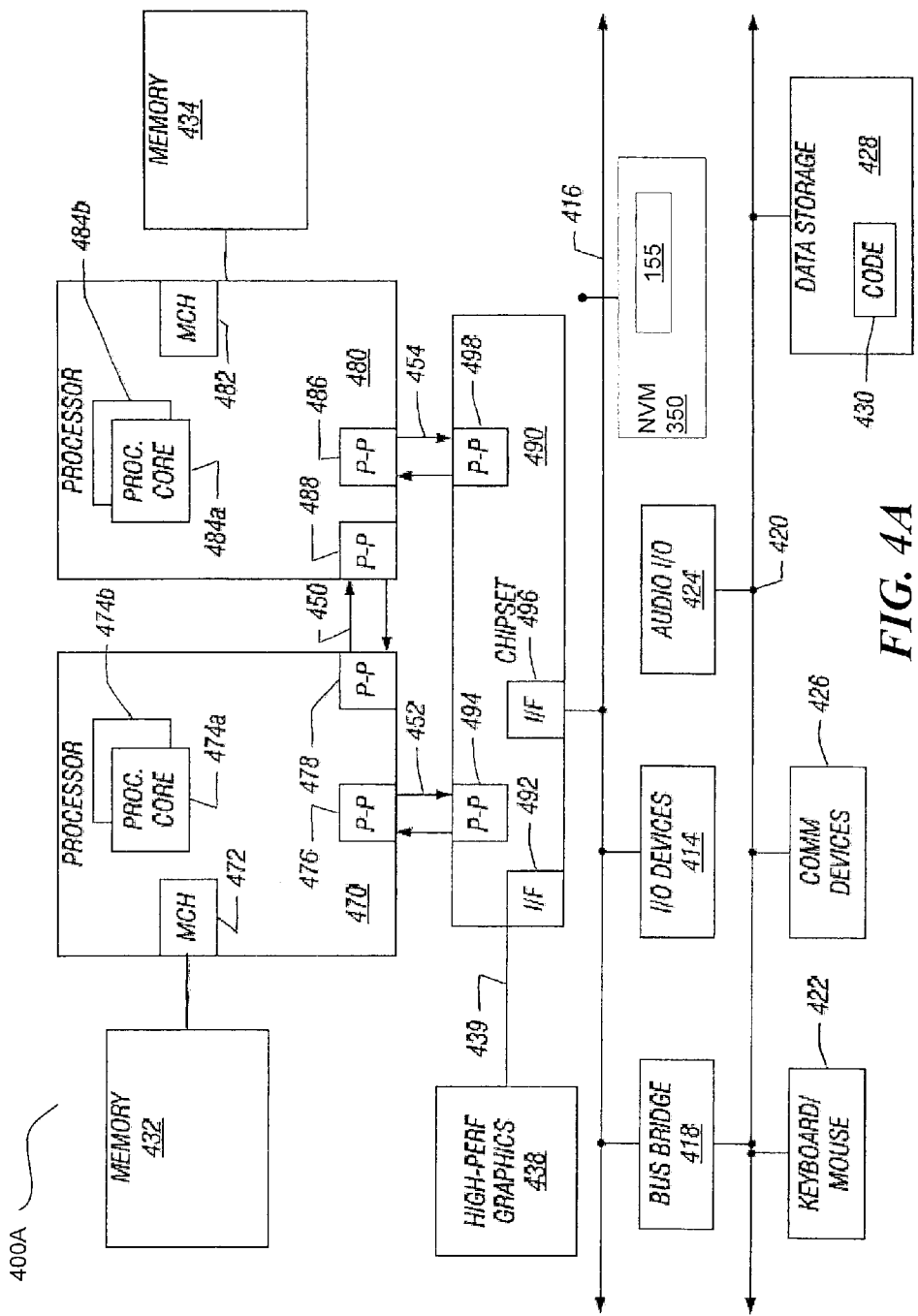
FIG. 4A is a block diagram of a multiprocessor system in accordance with an embodiment of the present invention that includes point-to-point interconnects.

Embodiments of the claimed subject matter may be implemented in many different system types. Referring now to FIG. 4A, shown is a block diagram of a point-to-point multiprocessor system 400 in accordance with an embodiment of the present invention. As shown in FIG. 4A, the multiprocessor system is a point-to-point interconnect system, and includes a first processor 470 and a second processor 480 coupled via a point-to-point interconnect 450. As shown in FIG. 4, each of processors 470 and 480 may be multicore processors, including first and second processor cores (i.e., processor cores 474a and 474b and processor cores 484a and 484b).

Rather having a north bridge and south bridge as shown above in connection with FIGS. 3A and 3B, the system 400A shown in FIG. 4A may instead have a hub architecture. The hub architecture may include an integrated memory controller hub Memory Controller Hub (MCH) 472, 482 integrated into each processor 470, 480. A chipset 490 (also sometimes referred to as an Interface Controller Hub, "ICH") may provide control of Graphics and AGP.

Thus, the first processor 470 further includes a memory controller hub (MCH) 472 and point-to-point (P-P) interfaces 476 and 478. Similarly, second processor 480 includes a MCH 482 and P-P interfaces 486 and 488. As shown in FIG. 4, MCH's 472 and 482 couple the processors to respective memories, namely a memory 432 and a memory 434, which may be portions of main memory locally attached to the respective processors.

While shown in FIG. 4 as being integrated into the processors 470, 480, the memory controller hubs 472, 482 need not necessarily be so integrated. For at least one alternative embodiment, the logic of the MCH's 472 and 482 may be external to the processors 470, 480, respectively. For such embodiment one or more memory controllers, embodying the logic of the MCH's 472 and 482, may be coupled between the processors 470, 480 and the memories 432, 434, respectively. For such embodiment, for example, the memory controller(s) may be stand-alone logic, or may be incorporated into the chipset 490.

First processor 470 and second processor 480 may be coupled to the chipset, or ICH, 490 via P-P interconnects 452 and 454, respectively. As shown in FIG. 4, chipset 490 includes P-P interfaces 494 and 498. Furthermore, chipset 490 includes an interface 492 to couple chipset 490 with a high performance graphics engine 438. In one embodiment, an Advanced Graphics Port (AGP) bus 439 may be used to couple graphics engine 438 to chipset 490. AGP bus 439 may conform to the *Accelerated Graphics Port Interface Specification, Revision* 2.0, published May 4, 1998, by Intel Corporation, Santa Clara, Calif. Alternately, a point-to-point interconnect 439 may couple these components.

In turn, chipset 490 may be coupled to a first bus 416 via an interface 496. In one embodiment, first bus 416 may be a Peripheral Component Interconnect (PCI) bus, as defined by the *PCI Local Bus Specification, Production Version, Revision* 2.1, dated June 1995 or a bus such as the PCI Express bus or another third generation input/output (I/O) interconnect bus, although the scope of the present invention is not so limited.

As shown in FIG. 4A, various I/O devices 414 may be coupled to first bus 416. The I.O devices 414 may include a display terminal or screen (not shown). In addition, a non-volatile store 350, such as a flash memory, may be coupled to the first bus 416. The memory 350 may include firmware instructions 155 for one or more capsule services modules.

A bus bridge 418 may couple first bus 416 to a second bus 420. In one embodiment, second bus 420 may be a low pin count (LPC) bus.

Various devices may be coupled to second bus 420 including, for example, a keyboard/mouse 422, communication devices 426 and a data storage unit 428 which may include code 430, in one embodiment. For at least one embodiment, code 430 may include an operating system. Further, an audio I/O 424 may be coupled to second bus 420. Note that other architectures are possible. For example, instead of the point-to-point architecture of FIG. 4, a system may implement a multi-drop bus or another such architecture.

Figure 4B:
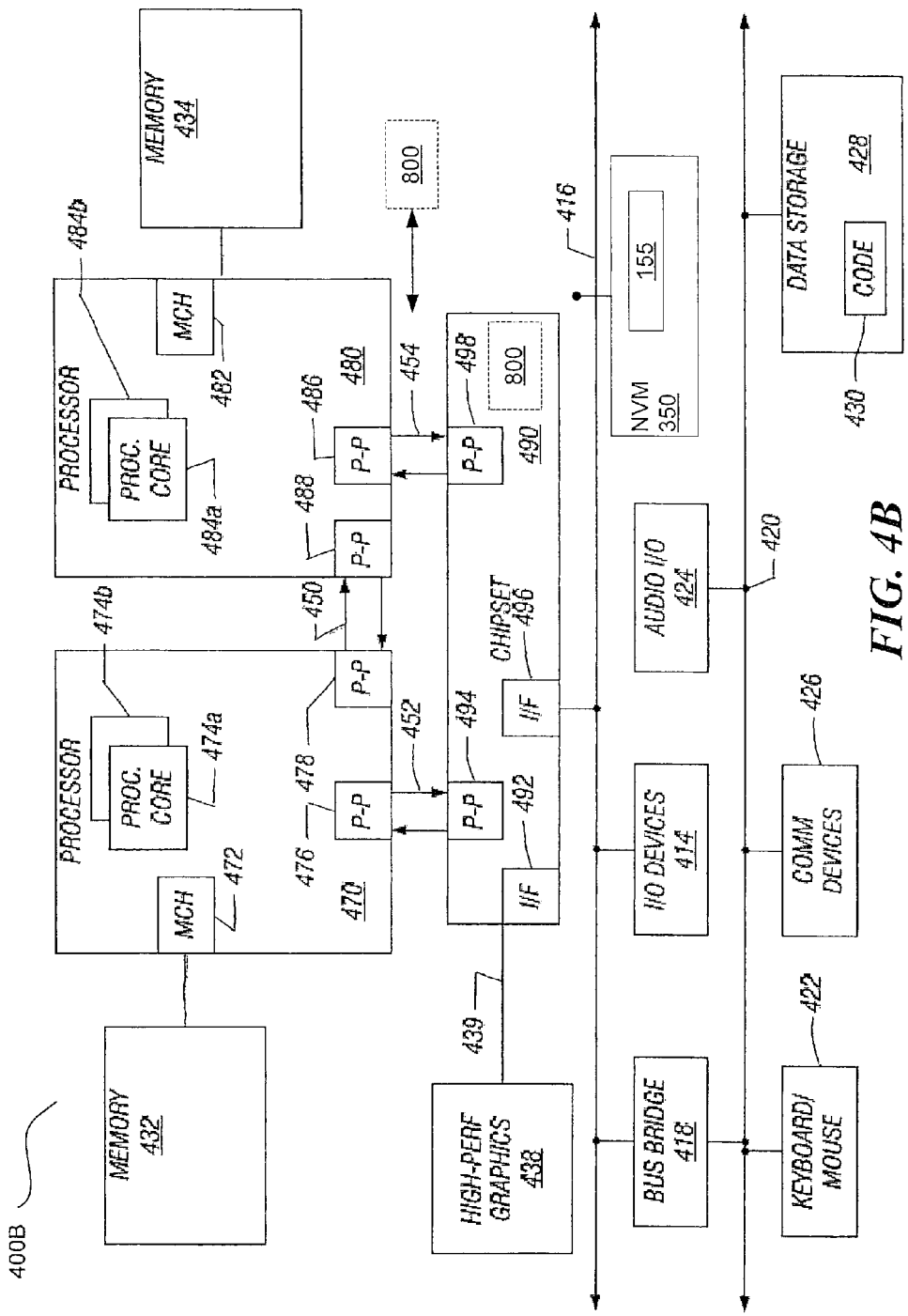
FIG. 4B is a block diagram of a multiprocessor system in accordance with an embodiment of the present invention that includes point-to-point interconnects.

FIG. 4B is a block diagram of a second embodiment of a point-to-point multiprocessor system 400B capable of performing disclosed techniques. Like elements in FIGS. 4A and 4B bear like reference numerals.

For at least one embodiment, the chipset 490 may include a secondary processor 800 that may be utilized to receive and process panic data from the firmware in accordance with at least one embodiment of the method 100 illustrated in FIG. 1. For at least one embodiment, for example, the secondary processor 800 may be a processor utilized to execute firmware that implements an Intel® Management Engine. As such, the processor 800 may part of a system 400 that implements the functionality of Intel® Active Management Technology ("Intel® AMT"). For such embodiment, the communication devices 426 of the system 400 may include a network connection, such as the Intel® 82566DM Gigabit Network Connection. This network connection identifies out-of-band network traffic (traffic targeted to Intel® AMT), and routes it to the secondary processor 800 rather than to the main processor(s) 470, 480. One of skill in the art will recognize that, in alternative embodiments, the secondary processor 800 may be a stand-alone processor (see alternative position of processor 800, denoted with broken lines), or may be incorporated into some other component of the system 400B instead of in the chipset 490.

As is stated above, although illustrated in FIG. 3B as being part of the north bridge 390, and illustrated in FIG. 4B as being part of the chipset 490, the secondary processor 800 may instead reside in other portions of the systems 300, 400 without departing from the scope of the appended claims. For example, the secondary processor 800 may, instead, be a standalone processor (see alternative placement of 800 in FIG. 4B)), may reside in the south bridge 319, or may reside in any other location of the system, either incorporated into another portion of the system, or as a standalone processor.

Figure 5:
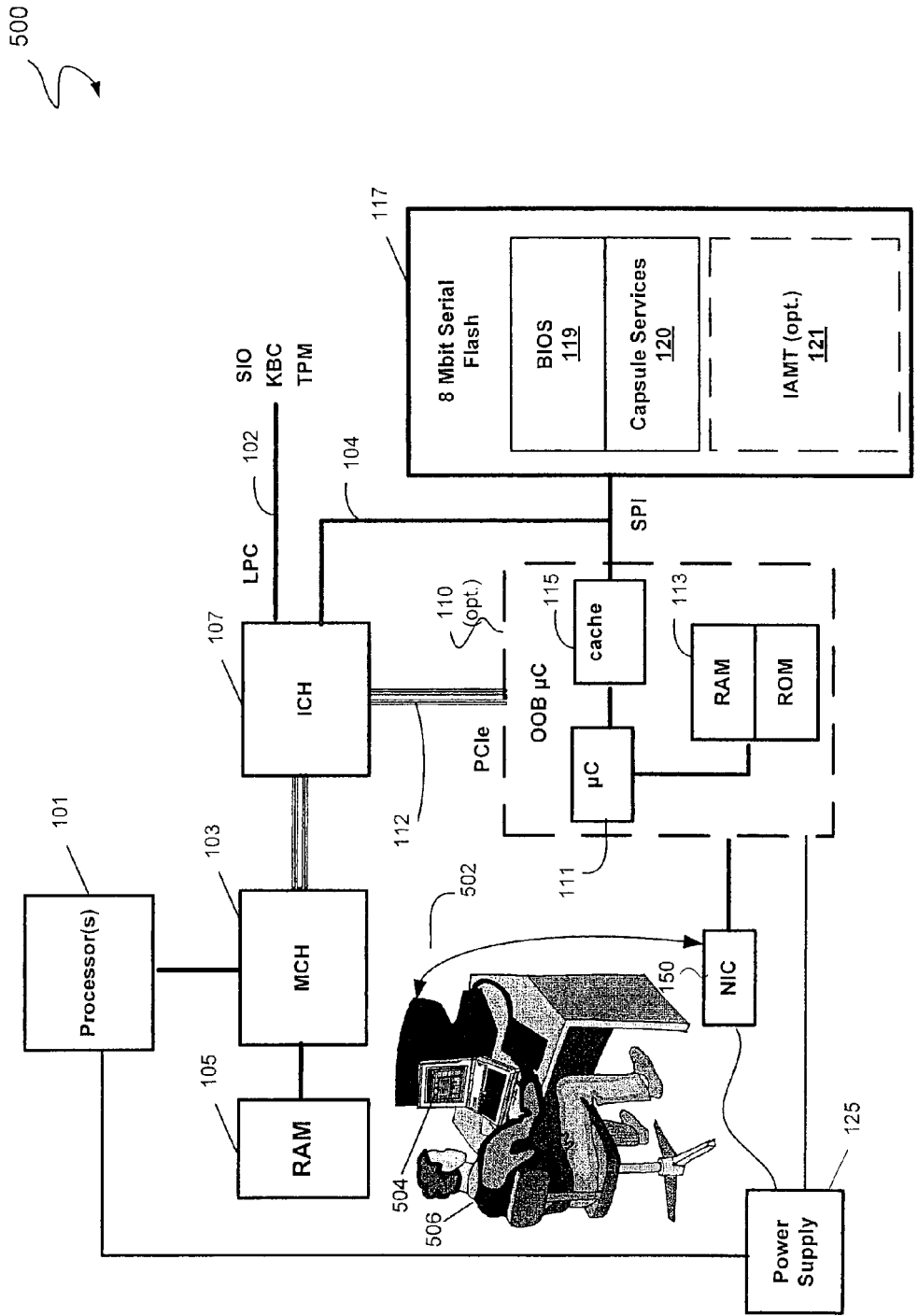
FIG. 5 is a block diagram illustrating features of an out-of-band microcontroller (OOB microcontroller), according to an embodiment of the environment.

FIG. 5 is a block diagram illustrating additional features of at least one embodiment of a sample secondary processor 800, referred to in FIG. 5 as an out-of-band (OOB) microcontroller 110. While such OOB microcontroller 110 is not necessary to perform many embodiments of the claimed invention (hence the optional nature of this element as denoted with broken lines in FIG. 5), it may be utilized in order to perform out-of-band processing of panic data in accordance with the method 100 illustrated in FIG. 1.

Embodiments of this system topology include a network connection, such as a network interface card (NIC) 150. NIC 150 may be used for OOB platform manageability and communication. For example, the NIC 150 may be utilized to send runtime panic data from the firmware to the OOB microcontroller 150 in accordance with the discussion of block 130 of FIG. 1, above.

For at least one embodiment, the OOB microcontroller 110 support may enable managing of the system without perturbing the performance of the system.

A platform 500 includes one more processors 101. Each processor 101 may be connected to random access memory 105 (such as, e.g., a dynamic random access memory) via a memory controller hub 103. Processor 101 may be any type of processor capable of executing software, such as a microprocessor, digital signal processor, microcontroller, or the like. Though FIG. 5 shows only one such processor 101, there may be one or more processors in the platform 500 and one or more of the processors may include multiple threads, multiple cores, or the like.

The processor 101 may be further connected to I/O devices via an input/output controller hub (ICH) 107. The ICH may be coupled to various devices, such as a super I/O controller (SIO), keyboard controller (KBC), or trusted platform module (TPM) via a low pin count (LPC) bus 102. The SIO, for instance, may have access to floppy drives or industry standard architecture (ISA) devices (not shown). In an embodiment, the ICH 107 is coupled to non-volatile memory 117 via a serial peripheral interface (SPI) bus 104. The non-volatile memory 117 may be flash memory or static random access memory (SRAM), or the like.

The OOB microcontroller 110 may connect to the ICH 107 via a communication pathway 112, which may be a bus, such as a peripheral component interconnect (PCI) or PCI express (PCIe) bus, or may alternatively be a point-to-point interconnect. The OOB microcontroller 110 may also be coupled with the non-volatile memory store (NV store) 117 via the SPI bus 104. The NV store 117 may be flash memory or static RAM (SRAM), or the like. In many existing systems, the NV store is flash memory.

The OOB microcontroller 110 may be likened to a "miniature" processor. Like a full capability processor, the OOB microcontroller has a processor unit 111 which may be operatively coupled to a cache memory 115, as well as RAM and ROM memory 113. The OOB microcontroller may have a built-in network interface 150 and independent connection to a power supply 125 to enable out-of-band communication even when the in-band processor 101 is not active, or fully booted.

In embodiments, the processor has a basic input output system (BIOS) 119 in the NV store 117. In other embodiments, the processor boots from a remote device (not shown) and the boot vector (pointer) resides in the BIOS portion 119 of the NV store 117. The OOB microcontroller 110 may have access to all of the contents of the NV store 117, including the BIOS portion 119, as well as firmware instructions to implement a logic module 120 for the UpdateCapsule service, and also a protected portion 121 of the non-volatile memory. For some embodiments, the protected portion 121 of memory may be secured with Intel® Active Management Technology (iAMT).

The OOB microcontroller may be coupled to the platform to enable SMBUS commands. The OOB microcontroller may also be active on the PCIe bus. An integrated device electronics (IDE) bus may connect to the PCIe bus. In an embodiment, the SPI 104 is a serial interface used for the ICH 107 to communicate with the flash 117. The OOB microcontroller may also communicate to the flash via the SPI bus. In some embodiments, the OOB microcontroller may not have access to one of the SPI bus or other bus.

The portion of NV memory 121 that is available only to the OOB microcontroller may be used to securely store certificates, keys and signatures that are inaccessible by the BIOS, firmware or operating system. The NIC 150 may be used to access the Internet, bulletin board or other remote system to validate keys and certificates stored in the NV memory 121. Without the use of the out-of-band communication, revocation and validation are not possible using the system firmware at boot time because no network connectivity exists until the host processor's drivers have been initialized. The OOB microcontroller can access the remote system early during boot of the host processor 101 on the platform to validate drivers and loaders to be used to fully boot the platform. The remote system may identify a specific certificate as being out of date or revoked. Without the ability to revoke the certificate prior to boot, the platform is vulnerable to counterfeit loaders, etc. The OOB microcontroller may identify revoked certificates from the remote system, for instance on a certificate revocation list (CRL), and mark them accordingly in the NV storage 121. Thus, upon boot a revoked certificate will not authenticate a counterfeit or out of date module, in error.

For at least some embodiments, the OOB microcontroller 110 is a manageability engine (ME) controller. The ME controller, also known simply as the manageability engine (ME), may be integrated into the platform. In some embodiments, the ME may perform other manageability functions, also known as iAMT capabilities. However, this functionality is not required to practice embodiments of the invention, as described herein. The ME can typically access the chipset registers through internal data paths or system bus (SMBUS) or PECI accessors.

For an embodiment that utilizes a system topology 500 such as that shown in FIG. 5 in order to perform the methods 100, 200 shown in FIGS. 1 and 2, certain performance goals may be met. Specifically, the OOB microcontroller 110 (manageability engine) may cooperatively assist in the manageability of the platform when panic data is pushed to a remote administrator through the manageability engine.

FIG. 5 illustrates that, accordingly, the OOB microcontroller may be coupled, via an out-of-band communication channel 502 provided by the NIC 150, to a display terminal 504. The administrator 506 may then view the displayed panic data n the display screen 504.

Embodiments of the mechanisms disclosed herein may be implemented in hardware, software, firmware, or a combination of such implementation approaches. Embodiments of the invention may be implemented as computer programs executing on programmable systems comprising at least one processor, a data storage system (including volatile and non-volatile memory and/or storage elements), at least one input device, and at least one output device.

Program code may be applied to input data to perform the functions described herein and generate output information. Accordingly, alternative embodiments of the invention also include machine-accessible media containing instructions for performing the operations of the invention or containing design data, such as HDL, that defines structures, circuits, apparatuses, processors and/or system features described herein. Such embodiments may also be referred to as program products.

Such machine-accessible media may include, without limitation, tangible arrangements of particles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The programs may be implemented in a high level procedural or object oriented programming language to communicate with a processing system. The programs may also be implemented in assembly or machine language, if desired. In fact, the mechanisms described herein are not limited in scope to any particular programming language. In any case, the language may be a compiled or interpreted language While particular embodiments of the present invention have been shown and described, it will be obvious to those skilled in the art that changes and modifications can be made without departing from the scope of the appended claims. For example, the foregoing mechanisms for using capsule services to push runtime panic data from the OS to the firmware may be equally applicable, in other embodiments, to other types of code rather than being limited to panic data.

Accordingly, one of skill in the art will recognize that changes and modifications can be made without departing from the present invention in its broader aspects. The appended claims are to encompass within their scope all such changes and modifications that fall within the true scope of the present invention.

What is claimed is:

1. A system, comprising:
a processor coupled with a firmware memory to store a capsule logic module; and
a memory coupled to the processor, the memory to store an operating system;
wherein the capsule logic module is further to receive panic data from the operating system responsive to detection of an unrecoverable error by the operating system.

2. The system of claim 1, wherein:
the panic data is run-time data.

3. The system of claim 1, wherein:
said firmware memory is a flash memory.

4. The system of claim 1, wherein:
said memory further comprises a dynamic random access memory module.

5. The system of claim 1, wherein:
said firmware memory is further to store logic to provide at least a portion of the panic data in a persistent storage location that is accessible to the operating system after reset of the processor.

6. The system of claim 1, wherein:
said system further comprises a second processor coupled to a display screen; and
said firmware memory is further to store logic to provide at least a portion of the panic data to the second processor for display on the display screen after reset of the processor.

7. The system of claim 6, wherein:
said second processor is manageability engine.

8. The system of claim 1, wherein:
said firmware memory is further to store logic to provide at least a portion of the panic data to an error log after reset.

9. The system of claim 1, wherein:
said firmware memory is further to store logic to provide at least a portion of the panic data to a script.

10. The system of claim 5, further comprising:
a network connection to support out-of-band communication with the second processor.

11. A method comprising:
receiving from an operating system, via a call to a capsule function, runtime data related to an unrecoverable error;
storing the runtime data in a nonvolatile memory location accessible by the operating system after a system reset;
performing system reset initialization processing; and
re-booting the operating system.

12. The method of claim 11, wherein:
said receiving, storing, performing and re-booting are performed prior to any display of the runtime data to a display screen.

13. The method of claim 11, further comprising:
performing pre-boot processing of the panic data before said re-booting.

14. The method of claim 13, wherein:
said pre-boot processing further comprises providing at least a portion of said panic data to a diagnostic script.

15. The method of claim 13, wherein:
said pre-boot processing further comprises providing at least a portion of said panic data for display on a display screen.

16. The method of claim 13, wherein:
said pre-boot processing further comprises providing at least a portion of said panic data to an error log.

17. An article comprising:
a tangible storage medium having a plurality of machine accessible instructions;
wherein, when the instructions are executed by a processor, the instructions provide for:
receiving a function call for a capsule payload related to an unrecoverable error encountered during execution of an operating system;
storing the payload in a persistent memory location that is accessible by the operating system after a system reset; and
re-booting the operating system.

18. The article of claim 17, wherein said instructions further provide for:
performing system reset initialization processing.

19. The article of claim 17, wherein said instructions further provide for:
displaying at least a portion of the capsule payload to a display screen.

20. The article of claim 19, wherein said instructions further provide for:
displaying at least a portion of the capsule payload to a display screen without invoking a Int 10h facility.

21. The article of claim 19, wherein said instructions further provide for:
displaying at least a portion of the capsule payload to a display screen via an UEFI-compliant display driver.

* * * * *